United States Patent
Li

(10) Patent No.: US 10,880,265 B1
(45) Date of Patent: Dec. 29, 2020

(54) SYSTEMS AND METHODS FOR IMPROVING NETWORK EFFICIENCY

(71) Applicant: Symantec Corporation, Mountain View, CA (US)

(72) Inventor: Qing Li, Cupertino, CA (US)

(73) Assignee: NORTONLIFELOCK, INC., Tempe, AZ (US)

(*) Notice: Subject to any disclaimer, the term of this patent is extended or adjusted under 35 U.S.C. 154(b) by 3 days.

(21) Appl. No.: 16/263,330

(22) Filed: Jan. 31, 2019

(51) Int. Cl.
| | | |
|---|---|---|
| H04L 29/12 | (2006.01) | |
| H04L 12/741 | (2013.01) | |
| H04L 12/46 | (2006.01) | |
| H04L 12/66 | (2006.01) | |
| H04L 12/715 | (2013.01) | |
| G06F 9/455 | (2018.01) | |
| H04L 29/06 | (2006.01) | |

(52) U.S. Cl.
CPC ...... *H04L 61/2592* (2013.01); *G06F 9/45558* (2013.01); *H04L 12/4633* (2013.01); *H04L 12/66* (2013.01); *H04L 45/64* (2013.01); *H04L 63/164* (2013.01); *G06F 2009/45595* (2013.01)

(58) Field of Classification Search
CPC ... H04L 61/2592; H04L 63/164; H04L 12/66; H04L 12/4633; H04L 45/64; G06F 9/45558; G06F 2009/45595
See application file for complete search history.

(56) References Cited

U.S. PATENT DOCUMENTS

| | | | | |
|---|---|---|---|---|
| 2012/0250682 | A1* | 10/2012 | Vincent | G06F 9/45558 370/390 |
| 2017/0180273 | A1* | 6/2017 | Daly | H04L 69/22 |
| 2017/0237724 | A1* | 8/2017 | Kariyanahalli | H04L 63/164 726/4 |
| 2017/0346730 | A1* | 11/2017 | Menon | H04L 45/745 |
| 2019/0020684 | A1* | 1/2019 | Qian | H04L 63/164 |
| 2019/0253454 | A1* | 8/2019 | Williams | H04L 12/4633 |

* cited by examiner

*Primary Examiner* — Nicholas R Taylor
*Assistant Examiner* — Sanjoy Roy
(74) *Attorney, Agent, or Firm* — FisherBroyles, LLP

(57) ABSTRACT

The disclosed computer-implemented method for improving network efficiency may include (i) receiving, from a client device, and at a publicly available on-demand cloud computing platform, a network packet that indicates an origination network address of an intermediary local network gateway that forwarded the network packet rather than an actual network address of the client device, and (ii) inserting, into the network packet, and at the publicly available on-demand cloud computing platform, network address translation information indicating a path to the actual network address of the client device to enable a virtual node within the publicly available on-demand cloud computing platform to identify the client device. Various other methods, systems, and computer-readable media are also disclosed.

20 Claims, 8 Drawing Sheets

SYSTEMS AND METHODS FOR IMPROVING NETWORK EFFICIENCY

BACKGROUND

Some third-party security vendors such as SYMANTEC may use a tunneling network security protocol, such as the tunneling mode version of INTERNET PROTOCOL SECURITY, to provide confidentiality and data integrity assurances to customers. Nevertheless, in some scenarios the use of a tunneling network security protocol effectively causes the internal private source network address from which network traffic originates to be exposed outside the address' allowed boundary. For example, the tunneling network security protocol may result in an original client workstation using a source network address inside of a network that may potentially conflict with another client workstation within another network. To prevent these potential conflicts, the security vendor may perform a network address translation procedure but still allow the unique identification of the original client workstation that generated the network traffic, by network traffic processing nodes other than the node that performs the network address translation procedure, after the completion of the network address translation procedure. Nevertheless, related methodologies for performing the network address translation procedure followed by subsequent identification of the original client workstation suffer from a number of different inefficiencies, as outlined in more detail below. The instant disclosure, therefore, identifies and addresses a need for systems and methods for improving network efficiency.

SUMMARY

As will be described in greater detail below, the instant disclosure describes various systems and methods for improving network efficiency. In one example, a computer-implemented method for improving network efficiency may include (i) receiving, from a client device, and at a publicly available on-demand cloud computing platform, a network packet that indicates an origination network address of an intermediary local network gateway that forwarded the network packet rather than an actual network address of the client device and (ii) inserting, into the network packet, and at the publicly available on-demand cloud computing platform, network address translation information indicating a path to the actual network address of the client device to enable a virtual node within the publicly available on-demand cloud computing platform to identify the client device.

In one embodiment, the network address translation information is inserted into a header space within the network packet. In one embodiment, the header space contains network protocol information that is used for network transmission prior to receiving the network packet at the publicly available on-demand cloud computing platform but is not used within the publicly available on-demand cloud computing platform such that at least a portion of the network protocol information may be overwritten. In one embodiment, the network protocol information corresponds to a network security protocol. In one embodiment, the network security protocol may include IPsec.

In some examples, inserting the network address translation information into the network packet is performed according to a distributed algorithm such that any virtual node within the publicly available on-demand cloud computing platform is enabled to execute the distributed algorithm. In one embodiment, inserting the network address translation information is performed for an entire transaction of network packets or inserting the network address translation information is performed for a first subset of network packets within the entire transaction of network packets. In one embodiment, the network packet, after inserting the network address translation information, still satisfies a maximum transmission unit.

In one embodiment, the network packet is routed to the publicly available on-demand cloud computing platform to perform a service that may include at least one of a security service or a network management service. In one embodiment, (i) inserting the network address translation information into the network packet is performed by an overlay network within the publicly available on-demand cloud computing platform, (ii) the overlay network receives the network packet according to an in-line zero-copy network packet routing operation, and (iii) the overlay network forwards the network packet to a final destination according to an in-line zero-copy network packet routing operation.

In one embodiment, a system for implementing the above-described method may include (i) a reception module, stored in memory, that receives, from a client device, and at a publicly available on-demand cloud computing platform, a network packet that indicates an origination network address of an intermediary local network gateway that forwarded the network packet rather than an actual network address of the client device, (ii) an insertion module, stored in memory, that inserts, into the network packet, and at the publicly available on-demand cloud computing platform, network address translation information indicating a path to the actual network address of the client device to enable a virtual node within the publicly available on-demand cloud computing platform to identify the client device, and (iii) at least one physical processor configured to execute the reception module and the insertion module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, from a client device, and at a publicly available on-demand cloud computing platform, a network packet that indicates an origination network address of an intermediary local network gateway that forwarded the network packet rather than an actual network address of the client device and (ii) insert, into the network packet, and at the publicly available on-demand cloud computing platform, network address translation information indicating a path to the actual network address of the client device to enable a virtual node within the publicly available on-demand cloud computing platform to identify the client device.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
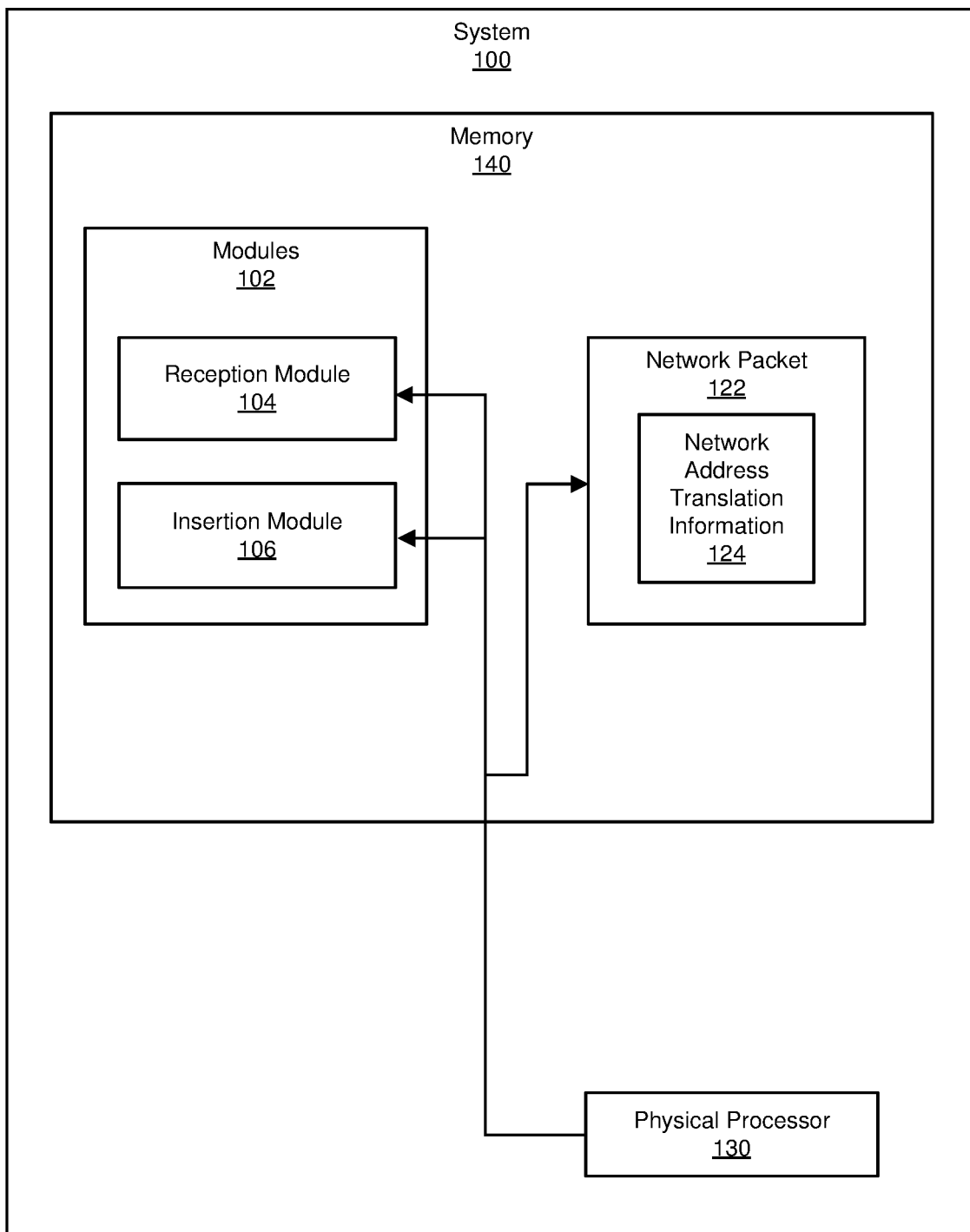
FIG. 1 is a block diagram of an example system for improving network efficiency.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for improving network efficiency. As further described below, the disclosed subject matter may improve upon related systems by improving the efficiency of network traffic routing and processing (e.g., internal network routing and processing within a publicly available on-demand cloud computing platform). More specifically, some network security protocols, including tunneling network security protocols such as the tunneling mode of INTERNET SECURITY PROTOCOL, may maintain private internal network addresses within a local network prior to encapsulation at a gateway according to the corresponding tunneling protocol. These private internal network addresses are designed to not be exposed outside of the local network. For these reasons, the private internal network addresses may potentially conflict with other private internal network addresses within other local networks, such as local networks using the same or similar tunneling protocol. These tunneling network security protocols may operate in this manner because conventional network traffic typically does not need to understand the full network path back to the actual originating workstation client device, but instead simply needs to know the network path back to the local network gateway, which can then forward responsive network traffic back to the client device without further exposing the private internal network address, as outlined above. Nevertheless, certain security and network management services, including proxy services that a third-party security vendor such as SYMANTEC may provide through leveraging a publicly available on-demand cloud computing platform, may be device-specific in the sense that the service executing within the cloud computing platform seeks to reference and uniquely identify the originating workstation client device (i.e., in order to perform a device-specific security and/or network management policy). Some related solutions for enabling the service to perform this identification procedure include using a network address translation table that is centralized within an overlay network in the cloud computing platform.

Nevertheless, the use of the centralized network address translation table results in a number of different inefficiencies, including internal network bandwidth congestion problems, as well as timing problems where packets arrive at virtual machines prior to the network address translation information arriving at these virtual machines, which prevents the virtual machines from performing the corresponding security and/or network management services (i.e., because they cannot uniquely identify the originating client devices without the information from the centralized network address translation table). Accordingly, the disclosed subject matter may leverage the inventive insight that a network packet, upon receipt, may be modified to insert information indicating a partial or full network path back to the originating client workstation device (e.g., at least one intermediary node network address, such as the network address of the local network gateway, which was optionally omitted from the network packet prior to this modification). This information may enable an internal virtual machine, which may be acting as a security device and/or network management device, to immediately apply a corresponding policy upon receiving the modified network packet, without waiting for any communications with a centralized network address translation table.

Figure 2:
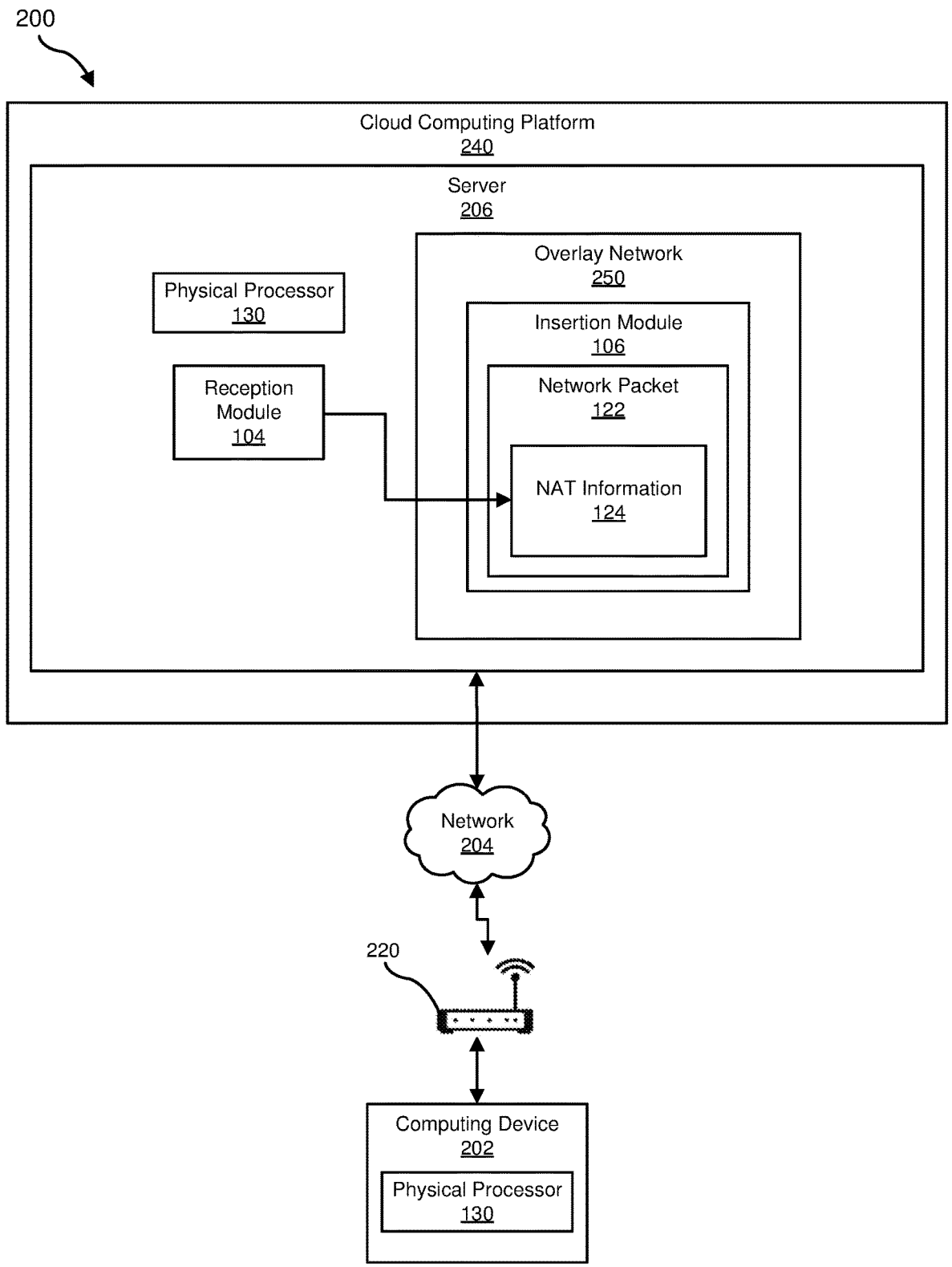
FIG. 2 is a block diagram of an additional example system for improving network efficiency.

The following will provide, with reference to FIGS. 1-2, detailed descriptions of example systems for improving network efficiency. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 7 and 8, respectively.

FIG. 1 is a block diagram of example system 100 for improving network efficiency. As illustrated in this figure, example system 100 may include one or more modules 102 for performing one or more tasks. For example, and as will be explained in greater detail below, example system 100 may include a reception module 104 that receives, from a client device, and at a publicly available on-demand cloud computing platform, a network packet 122 that indicates an origination network address of an intermediary local network gateway that forwarded the network packet rather than an actual network address of the client device. Example system 100 may additionally include an insertion module 106 that inserts, into network packet 122, and at the publicly available on-demand cloud computing platform, network address translation information 124 indicating a path to the actual network address of the client device to enable a virtual node within the publicly available on-demand cloud computing platform to identify the client device. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate improving network efficiency. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to improve network efficiency.

For example, and as will be described in greater detail below, reception module 104 may receive, from a client device such as computing device 202, and at an overlay network 250 within a publicly available on-demand cloud computing platform, such as a cloud computing platform 240, network packet 122 that indicates an origination network address of an intermediary local network gateway, such as a local network gateway 220, that forwarded network packet 122 rather than an actual network address of computing device 202. Insertion module 106 may insert, into network packet 122, and at cloud computing platform 240, network address translation information 124 indicating a path to the actual network address of computing device 202 to enable a virtual node within cloud computing platform 240 to identify computing device 202.

Computing device 202 generally represents any type or form of computing device capable of reading computer-executable instructions. In some illustrative examples, computing device 202 may correspond to an end user workstation within a local area network that is protected by a tunneling security protocol applying encapsulation policies at a local network gateway, as discussed further below. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of performing method 300. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
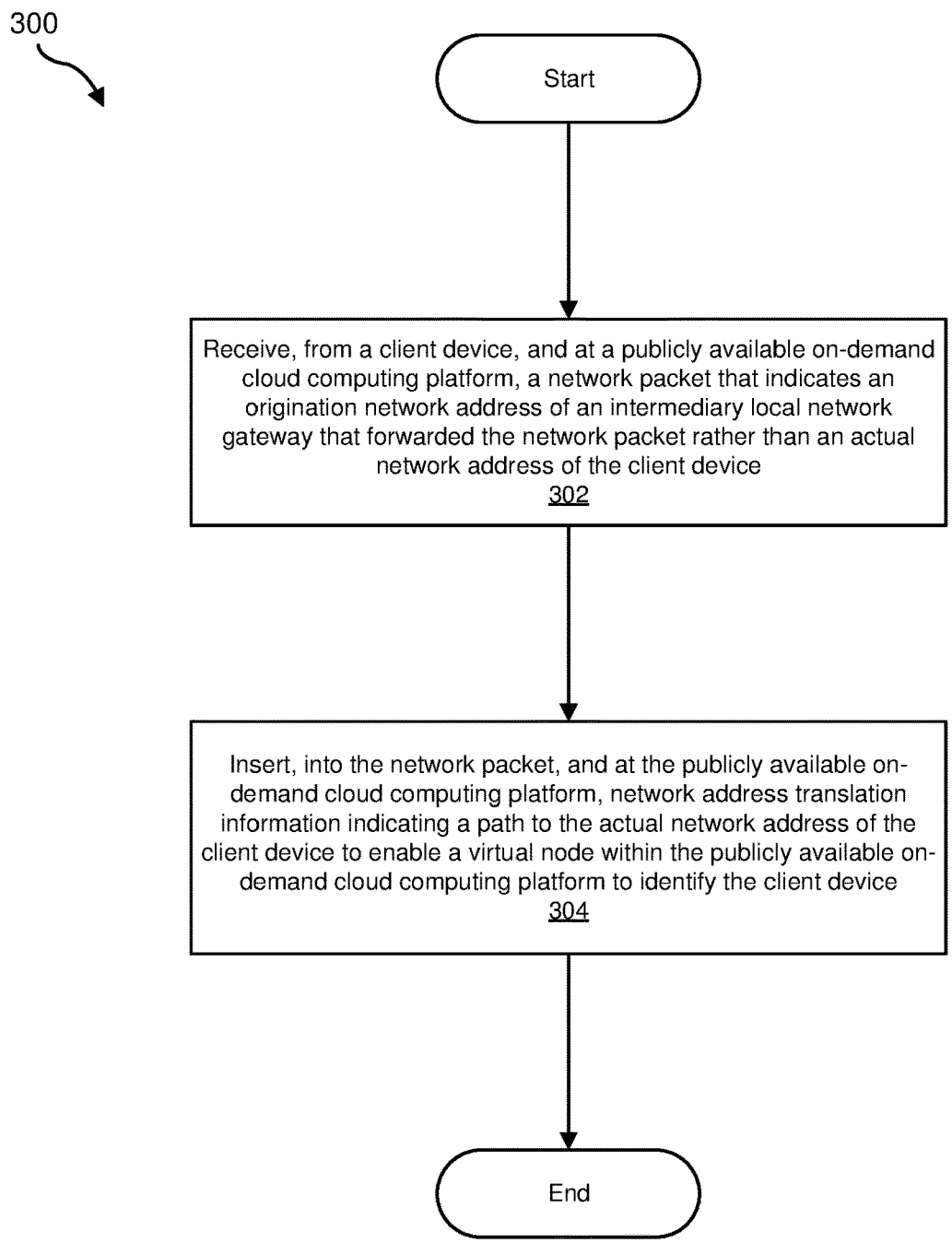
FIG. 3 is a flow diagram of an example method for improving network efficiency.

FIG. 3 is a flow diagram of an example computer-implemented method 300 for improving network efficiency. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may receive, from a client device, and at a publicly available on-demand cloud computing platform, a network packet that indicates an origination network address of an intermediary local network gateway that forwarded the network packet rather than an actual network address of the client device. For example, reception module 104 may receive, from computing device 202, and as part of a publicly available on-demand cloud computing platform, network packet 122 that indicates an origination network address of intermediary local network gateway 220 that forwarded network packet 122 rather than an actual network address of computing device 202.

As used herein, the term "publicly available on-demand cloud computing platform" generally refers to publicly available cloud computing platforms that provide general purpose, standardized virtual computing processing to members of the general public subscribing to these services. The virtual computer processing may be general-purpose and standardized in the sense that, prior to programming or configuration by subscribers, the corresponding virtual machines are not programmed to perform application-specific processing, such as the security and network management functionality performed in accordance with method 300 and as discussed in more detail below. For example, in the context of method 300, a third-party security vendor such as SYMANTEC may provide security and/or network management functionality by redirecting network traffic that was originally directed to one or more final destinations on a wide area network such as the Internet to another intermediary location within a publicly available cloud computing platform. Illustrative examples of publicly available on-demand cloud computing platforms may include AMAZON AWS, MICROSOFT AZURE, GOOGLE CLOUD, ALIBABA CLOUD, and/or TENCENT CLOUD. Upon successfully arriving at the cloud computing platform, after being redirected there, an overlay network within the cloud computing platform may perform one or more specialized security and/or network management services. The third-party security vendor may have established the overlay network by programming and configuring a network topology using available standardized virtual machines within the cloud computing platform in order to perform method 300. In other words, customers may rely on the third-party vendor to process network traffic, prior to releasing it onto the larger Internet, and this processing may be performed within an overlay network that the third-party vendor configured and established within the otherwise general-purpose virtual computer resources of the cloud computing platform.

At step 302 the network packet may indicate an original network address of an intermediary local network gateway, rather than the actual network address of computing device 202, due to the use of a tunneling security protocol. In other words, the term "tunneling" generally refers to network protocols that encapsulate, or otherwise manipulate, network traffic such that a recipient of the network traffic views this traffic, from the recipient's perspective, as having originated from a different intermediary network node rather than from originating from the actual network node that truly originated the traffic. In the case of using the tunneling mode of the INTERNET SECURITY PROTOCOL, the local network gateway, such as local network gateway 220, may apply this protocol by encapsulating original network traffic such that an original network packet is encrypted and embedded within a payload of a larger encapsulating network packet according to the protocol specification. The larger encapsulated network packet may specify an originating network address of the local network gateway, which is the same local network gateway applying the encapsulation procedure according to the tunneling protocol. Accordingly, one or more network nodes that receive this encapsulated network traffic, such as an edge virtual machine and/or a corresponding edge router within overlay network 250 in cloud computing platform 240 may view, from its perspective, the network traffic as originating from the local network gateway.

Nevertheless, as further described above, the various security and/or network management services provided by overlay network 250 may reference, or request, a unique identification of computing device 202 in order to apply device-specific policies. In other words, it is not sufficient, in the context of these security and network management applications, to merely understand that the network traffic is originating from local network gateway 220 and furthermore originates from one or more mysterious and unspecified workstations that are attached to local network gateway 220. Instead, the various security and/or network management applications analyze and modify network traffic differently depending on which specific device attached to the local network gateway is originating this network traffic. For example, an end user personal laptop might receive different security and/or network management treatment than an Internet-of-things device receives, and an end user's smartwatch might receive different treatment than a management enterprise business workstation receives. Accordingly, one or more of the virtual machines forming overlay network 250 within cloud computing platform 240 may request, or reference, an identifier of the actual computing device 202 that originated the network traffic.

Moreover, in these scenarios, it is not sufficient to provide the private internal network address, such as an Internet protocol address, of computing device 202 because under standard tunneling security protocols, such as the tunneling version of INTERNET PROTOCOL SECURITY, these private internal network addresses are not configured to be unique across the Internet and, for that reason, they may potentially conflict with other private internal network addresses of other private networks, including other private networks using the same tunneling security protocol. Instead, the disclosed subject matter includes systems and methods whereby insertion module 106 may insert network address translation information 124, which may further specify a path back to computing device 202, and in particular may insert a network address of local network gateway 220 such that one or more virtual machines processing the network traffic within overlay network 250 may uniquely identify computing device 202 by referencing both (i) the network address, such as an Internet protocol address, for local network gateway 220 and also (ii) the network address for computing device 202, even if that is a private Internet protocol address that is not configured to be exposed outside of its local network.

At step 304, one or more of the systems described herein may insert, into the network packet, and at the publicly available on-demand cloud computing platform, network address translation information indicating a path to the actual network address of the client device to enable a virtual node within the publicly available on-demand cloud computing platform to identify the client device. For example, insertion module 106 may insert, into network packet 122, and at cloud computing platform 240, network address translation information 124 indicating a path to the actual network address of computing device 202 to enable a virtual machine within cloud computing platform 240 to identify computing device 202.

As used herein, the term "network address translation information" generally refers to one or more of the following items of information: (i) the original internal and private network address (e.g., Internet protocol address) of computing device 202, (ii) the public network address (e.g., Internet protocol address) of local network gateway 220, and/or (iii) a public network address (e.g., Internet protocol address) for a node or router at cloud computing platform 240, where this public network address results from a translation of the combination of items of information (i) and (ii) into item of information (iii). In other words, network packet 122 originally only includes item of information (i) as a source identifier, yet this item of information does not uniquely identify computing device 202, due to the use of the tunneling network security protocol, as further discussed above. Accordingly, prior to cloud computing platform 240 releasing network packet 122 onto the Internet to reach its final destination (e.g., the original destination intended by the user at computing device 202), cloud computing platform 240 may assign a public network address to network packet 122, as a proxy source network address, such that network packet 122, when released onto the Internet, indicates item of information (iii) as the source network address to which responsive network traffic may be directed, and as discussed further below.

Insertion module 106 may insert the network address translation information into the network packet in a variety of ways. In some examples, the network address translation information is inserted into a header space within the network packet (i.e., appended to the network packet, after stripping off the tunneling header, without overflowing a path maximum transmission unit afforded by the overlay network in the cloud computing platform). The header space may optionally contain network protocol information that is used for network transmission prior to receiving the network packet at cloud computing platform 240. Furthermore, in some scenarios, the same network protocol information may not be used within the publicly available on-demand cloud computing platform. For example, the network protocol information may correspond to a network security protocol, and especially a tunneling network security protocol such as INTERNET PROTOCOL SECURITY. In these examples, according to the tunneling mode of this specific network security protocol, a tunnel may be established between local network gateway 220 and an edge virtual machine and corresponding edge router within overlay network 250 of cloud computing platform 240.

Upon arriving at the edge virtual machine, the edge virtual machine may optionally perform a de-encapsulation process to extract the original and unmodified network packet that was previously encapsulated, according to the tunneling network security protocol, by local network gateway 220. Upon successfully extracting the original and unmodified network packet, the original network address indicating that the modified network packet originated from local network gateway 220 (e.g., within the INTERNET SECURITY PROTOCOL header space) may be effectively stripped such that the original and unmodified network packet only specifies the private network address of computing device 202 without further specifying the original network address of local network gateway 220. Accordingly, at the end of this de-encapsulation and extraction process, an additional virtual machine seeking to apply one or more security and/or network management services may not find the information within the original and unmodified network packet to be sufficient to uniquely identify computing device 202. For example, as further discussed above, in some scenarios the private Internet protocol address for computing device 202 by itself may not uniquely identify computing device 202, because this address may potentially conflict with the same private Internet protocol address when the same address is used within a different and distinct private network.

Figure 4:
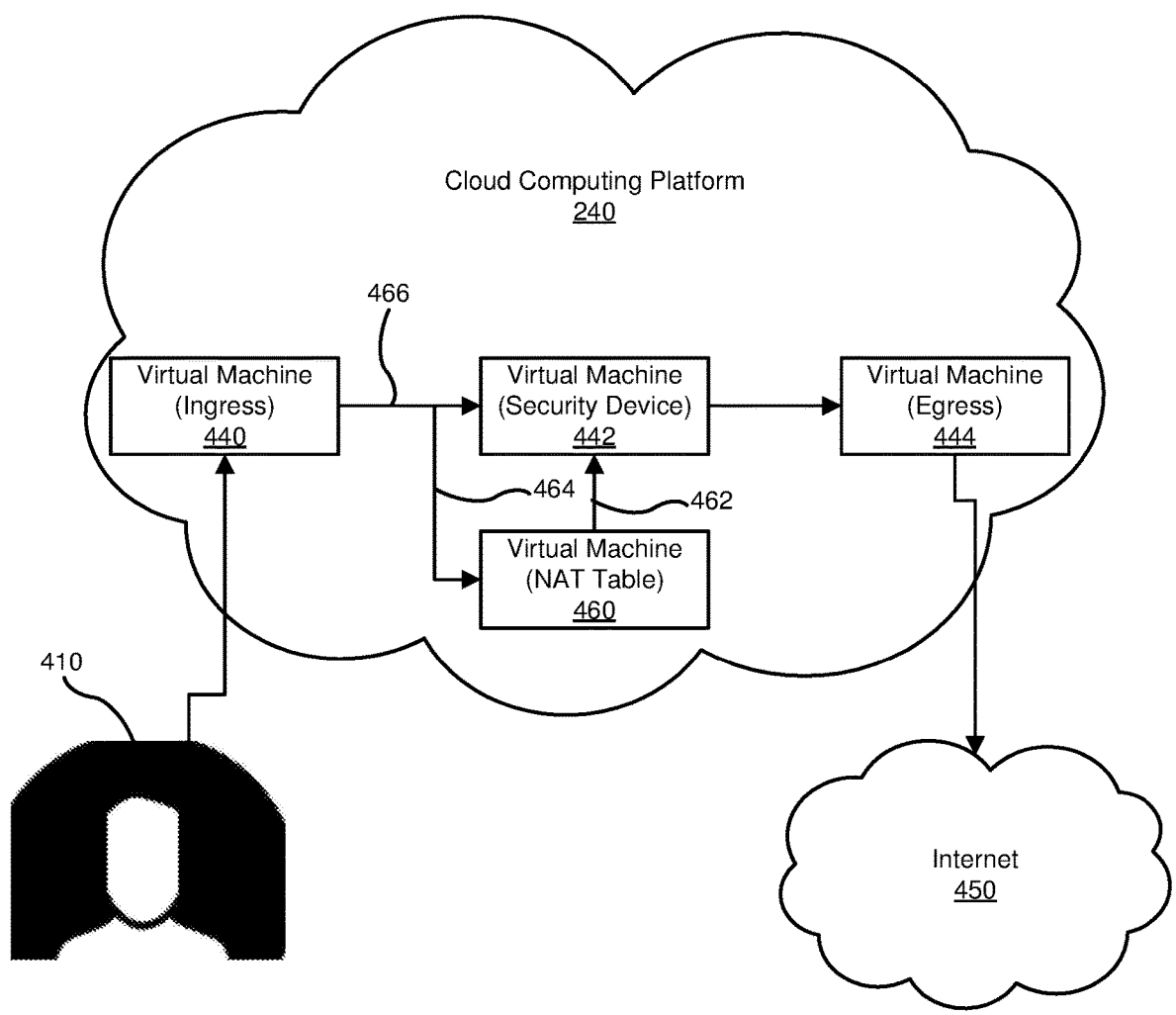
FIG. 4 is a block diagram of an example workflow for improving network efficiency.

FIG. 4 shows an illustrative example of cloud computing platform 240 that may operate in accordance with a related methodology to address the problem of a virtual machine, such as a virtual machine 442 acting as a security device, not extracting sufficient information from the original and unmodified network packet itself to uniquely identify a corresponding computing device, such as computing device 202. According to this related methodology, cloud computing platform 240 may first receive the modified and encapsulated network packet at an ingress virtual machine 440. The network packet may have originated from a user 410 and be directed to a final destination on Internet 450. Additionally, an egress virtual machine 444 may optionally forward the network packet to the final destination on Internet 450 after performing the network address translation procedure. In some examples, virtual machine 440 may operate effectively as an edge virtual machine or corresponding edge router within cloud computing platform 240 and the corresponding overlay network that is further discussed above. Accordingly, virtual machine 440 may perform a de-encapsulation and extraction process according to a tunneling network security protocol such as INTERNET PROTOCOL SECURITY. Subsequently, virtual machine 440 may thereby provide the original network packet to be specially processed by one or more security and/or network management services. For example, virtual machine 442 may operate as a security device and may thereby provide an application-specific security processing to corresponding inbound network traffic. Accordingly, ingress virtual machine 440 may provide a copy of the original network packet to virtual machine 442 at step 466.

As further discussed above, the original network packet forwarded to virtual machine 442 at step 466 may not be sufficient for virtual machine 442 to uniquely identify computing device 202 and thereby apply device-specific policies. To address this shortcoming, the related methodology may involve virtual machine 440 further forwarding one or more items of information (e.g., corresponding to network address translation information 124) to another network node, such as a virtual machine 460, which may further provide network address translation services, such as by maintaining a centralized network address translation table (e.g., the results of network address translation procedures performed by ingress virtual machine 440). Accordingly, virtual machine 460 may perform the helpful functionality of maintaining these items of information in a centralized database (e.g., the network address for computing device 202 and/or the network address for local network gateway 220, as mapped to a corresponding public Internet protocol address corresponding to overlay network 250 within cloud computing platform 240). For example, virtual machine 440 may optionally translate these items of information (e.g., the original network address for local network gateway 220 and the actual network address for computing device 202, in combination) into a unique public address, such as an Internet protocol address, for computing device 202. Furthermore, after performing this helpful translation operation, virtual machine 440 may thereby forward one or more of these translated items of information, at step 464, to virtual machine 460, which may also further forward one or more of these items of information, at step 462, to virtual machine 442, thereby enabling virtual machine 442 to identify the unique device corresponding to computing device 202 such that virtual machine 442 may thereby apply device-specific security and/or network management policies, as further discussed above.

Nevertheless, the related methodology described above in connection with FIG. 4 suffers from a number of shortcomings. First, virtual machine 460 may repeat the process, at step 462, for each instance of network traffic and/or corresponding network transactions received by one or more ingress virtual machines, such as virtual machine 440. Similarly, virtual machine 460 may also repeat the process, at step 462, for each additional security and/or network management virtual machine, such as virtual machine 442. In other words, although FIG. 4 only shows a single security/management virtual machine, in the form of virtual machine 442, in practice one or more instances of network traffic may undergo a larger sequence of processing at a number of different virtual machines acting as security devices and/or network management devices. Accordingly, in these examples each one of the internal security/management virtual machines may similarly receive from virtual machine 460 a copy of the translated items of information discussed above regarding step 462. All of these different instances of transmitting the translated items of information create a potential for network congestion within cloud computing platform 240. Additionally, in many scenarios there may be timing incompatibilities whereby one or more of the security/management virtual machines receives the original network packet, corresponding to step 466, as discussed above, prior to receiving the translated items of information enabling these virtual machines to uniquely identify the corresponding computing device, corresponding to step 462. In other words, in some scenarios step 466 occurs prior to step 462, such that the security/management virtual machines may receive the original network packet at a time when they do not yet possess the information used to reference, and uniquely identify, the original client computing device that originated this network traffic and that would enable device-specific security/management policy application. Accordingly, even if the actual Internet protocol address for computing device 202 may be private and potentially conflict with another Internet protocol address within another distinct private network, and thereby may fail to uniquely identify computing device 202, this private Internet protocol address may uniquely identify computing device 202 when it is considered in combination with the original network address of local network gateway 220, which may be a public Internet protocol address, and which may be inserted into network packet 122 by insertion module 106.

Figure 5:
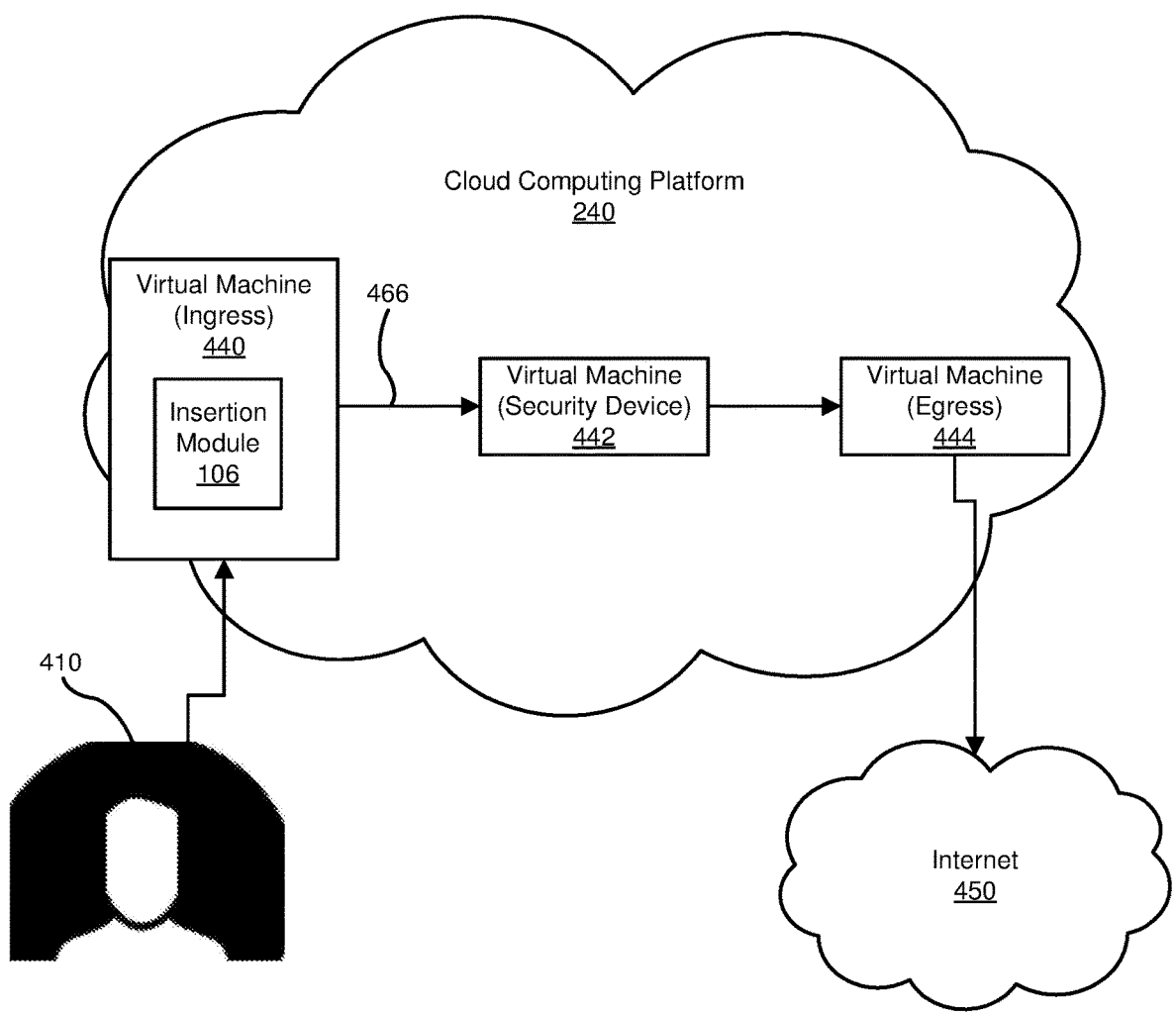
FIG. 5 is a block diagram of an example workflow for improving network efficiency.

In view of the above, FIG. 5 shows another illustration of a solution, and in accordance with method 300, for addressing these shortcomings associated with the system of FIG. 4. The example of FIG. 5 is similar to the example of FIG. 4, except that in this instance virtual machine 460 has been removed, because the inventive solution of this application eliminates any use or requirement for the corresponding centralized network address translation table maintenance. Instead, the example of FIG. 5 illustrates how ingress virtual machine 440, which may function as the edge node or edge router, as outlined above, may include insertion module 106 (additionally, although not illustrated in FIG. 5, virtual machine 440 may also include reception module 104 in accordance with step 302, as discussed above). Insertion module 106 may insert information into network packet 122 that enables virtual machine 442 to uniquely and appropriately identify computing device 202 such that virtual machine 422 may apply device-specific policies without risk of a conflict between network addresses such as internal Internet protocol addresses within different and separate private networks. Accordingly, network address translation information 124, which may optionally include the network address or Internet protocol address for local network gateway 220, may be inserted into the network packet and thereby substitute for the translated items of information that were previously transmitted to virtual machine 422 at step 462 of the related methodology discussed above in connection with FIG. 4. In other words, insertion module 106 may effectively restore one or more items indicating the network path back to computing device 202, including the network address or Internet protocol address for local network gateway 220, which previously had been stripped from the network packet during the de-encapsulation procedure at virtual machine 440. Consequently, according to one inventive solution of this application, virtual machine 442 may thereby receive both the original network packet (with the caveat that the network packet has now been padded to further include network address translation information 124) at the same time that virtual machine 442 receives the further information (i.e., network address translation information 124) enabling virtual machine 442 to uniquely and appropriately identify computing device 202 such that it may apply device-specific policies, as discussed above.

Moreover, because the INTERNET PROTOCOL SECURITY tunnel effectively ends at virtual machine 440 in FIG. 5, there is no further need to use the contents of the header space that was previously used by this tunneling network security protocol. Accordingly, this application discloses the inventive insight that, after successful authentication or other processing at ingress virtual machine 440, some or all of the additional network packet space for the header for the tunneling network security protocol may be overwritten or substituted, thereby providing space for one or more items of new and different information, such as network address translation information 124, as further discussed above. In view of the above, the disclosed subject matter herein re-purposes, and effectively reengineers, the use of the tunneling network security protocol header space to thereby provide a place for restoring one or more items of information that otherwise might have been stripped from the network packet, and which enable one or more security/management virtual machines to uniquely and appropriately identify the client device that originated the network traffic.

In some examples, insertion module 106 may insert the network address translation information into the network packet according to a distributed algorithm. Accordingly, in these examples, any suitable virtual machine within overlay network 250 may effectively execute the distributed algorithm corresponding to method 300.

Similarly, in some examples, the network packet may correspond to a network transaction, such as an e-commerce network transaction, being processed by an online e-commerce banking or commercial website or application. For example, the e-commerce banking or commercial website may correspond to a bank such as US BANK or an e-commerce platform such as AMAZON. One or more of these illustrative commercial organizations may have subscribed to security and/or network management services provided by a third-party vendor, such as SYMANTEC. Accordingly, when an end user such as user 410 attempts to complete a transaction, such as purchasing goods or services, or modifying online banking accounts, the end user may thereby generate a series of network packets according to the corresponding network traffic. In view of the above, insertion module 106 may in some examples perform the insertion of the network address translation information into each one of the network packets in the entire series corresponding to the transaction. Alternatively, in other examples, insertion module 106 may instead only insert the network address translation information into one or more of an initial subset of the network packets corresponding to the entire network transaction, without further performing the insertion procedure for a remainder of the network packets. Insertion module 106 may limit itself in the latter scenario due to the fact that a corresponding virtual machine, such as virtual machine 442, may optionally cache a copy of the network address translation information upon first receiving an initial network packet for the entire transaction. Accordingly, upon receiving one or more subsequent network packets for the same transaction, the same virtual machine may already possess a local copy within its cache and, therefore, the virtual machine may not need to benefit from additional instances of the insertion procedure corresponding to step 304.

In some examples, insertion module 106 may insert the network address translation information into the network packet in a manner that still satisfies a maximum transmission unit. In other words, the maximum transmission unit may define a maximum size of an entire network packet, including both the payload and all of the headers of the network packet, beyond which the network packet will be broken apart according to standard network routing procedures. These network fragmentation procedures may significantly complicate the processing of the network packet and thereby introduce network bandwidth congestion and other inefficiencies. Accordingly, in some scenarios it is desirable to prevent any addition of material onto the network packet from breaking the threshold defined by the maximum transmission unit. Fortunately, the network address translation information inserted into the network packet at step 304 is relatively small in size and, therefore, generally will not violate the threshold defined by the path maximum transmission unit. In other words, the network address translation information inserted into the network packet generally will not be larger than the size of the original tunneling network security protocol header space (e.g., the IPSec header space), such that, if the original and unmodified network packet, including the original tunneling network security protocol header space, did not violate the path maximum transmission unit, then the modified network packet after step 304 should also not violate the path maximum transmission unit. In some illustrative examples, the path maximum transmission unit may correspond to 1500 bytes of information.

Additionally, in some examples, inserting the network address translation information into the network packet is performed by overlay network 250 within cloud computing platform 240. Moreover, in these examples, overlay network 250 may optionally receive the network packet according to an in-line zero-copy network packet routing operation. Similarly, in these examples, overlay network 250 may optionally forward the network packet to a final destination on the Internet according to an in-line zero-copy network packet routing operation.

Figure 6:
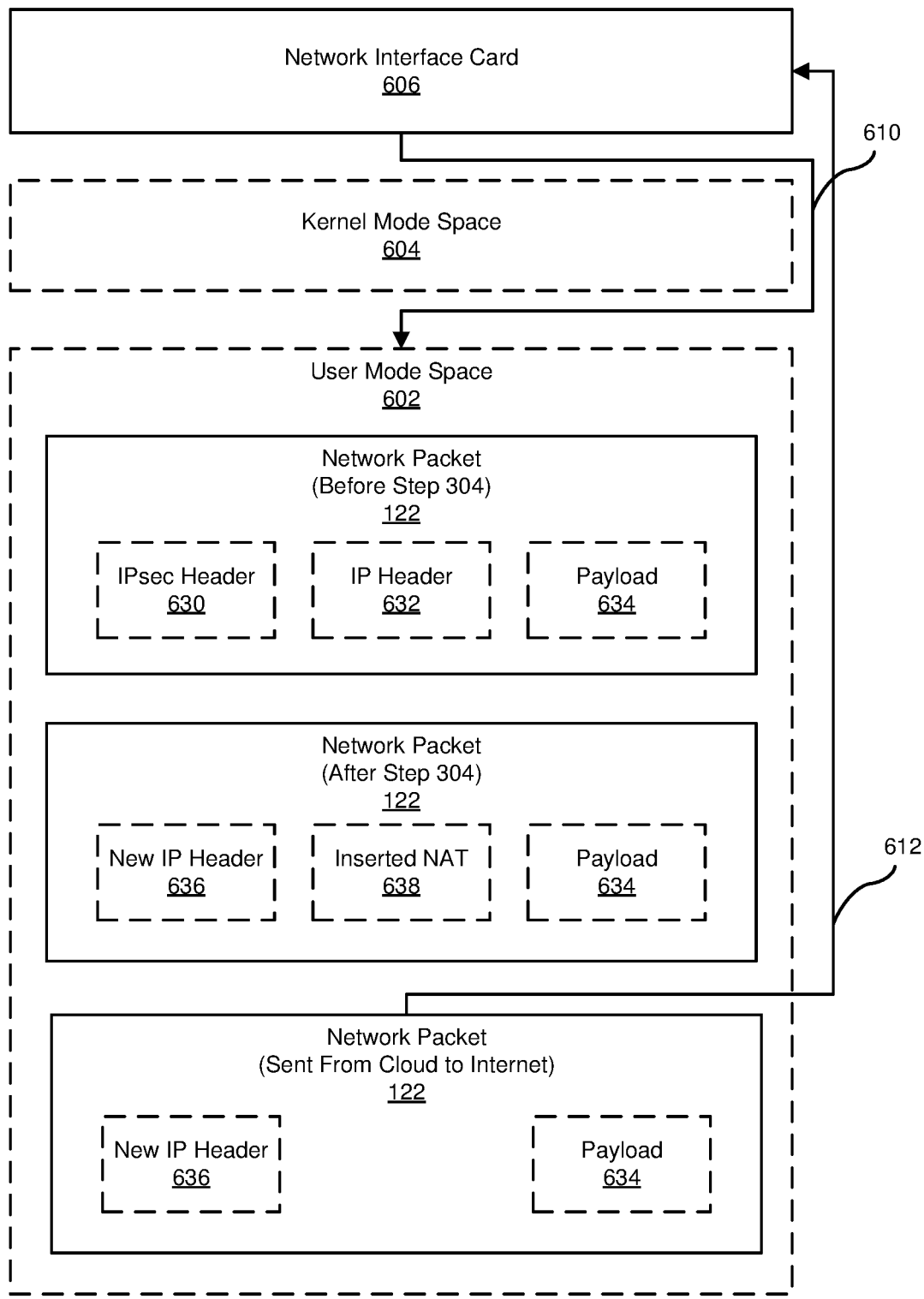
FIG. 6 is a block diagram of an example workflow for improving network efficiency.

FIG. 6 provides an illustrative example of how overlay network 250 may perform the in-line zero-copy network packet routing operations. As further shown in this figure, the corresponding workflow for the processing of network packet 122 may reference a network interface card 606, which may be associated with a virtual machine within cloud computing platform 240 where the virtual machine further includes a kernel mode space 604 as well as a user mode space 602. Traditional methods for performing network traffic processing and routing may include one or more instances of copying the network packet from kernel mode space 604 into user mode space 602 in order to perform the processing or modifications within user mode space 602. In contrast, however, in some examples overlay network 250 may leverage new and inventive in-line zero-copy network packet routing operations which effectively skip kernel mode space 604 and, instead, directly place network packet 122 within user mode space 602 from network interface card 606. FIG. 6 further illustrates how network packet 122 may originally be received at network interface card 606 and thereby be directly placed within user mode space 602 according to an in-line zero-copy network packet routing operation 610. After the performance of this in-line zero-copy network packet routing operation, and before the performance of step 304, network packet 122 may include an IPsec header 630, an Internet protocol header 632, and a payload 634.

As further explained above, ingress virtual machine 440 may effectively strip IPsec header 630 from network packet 122 upon receipt in accordance with standard IPsec de-encapsulation procedures. The stripping of IPsec header 630 may thereby release the corresponding space for the insertion of one or more items of substitute information without violating the path maximum transmission unit. Accordingly, FIG. 6 further shows how insertion module 106 may insert inserted NAT 638, which may correspond to network address translation information 124. In other words, insertion module 106 may insert any permutation of the following items of information: (i) the original network address for local network gateway 220, (ii) the actual network address for computing device 202, and/or (iii) the translated public network address that results from translating items of information (i) and (ii) into a proxy public network address that cloud computing platform 240 may use to receive responsive network traffic, as further discussed above. Additionally, insertion module 106 may also optionally insert one or more items of contextual information, which may include any one or more of a customer site identifier, a customer identifier, a list of exempted source network addresses, a list of exempted network destinations, a subnet, a bandwidth cap, and/or a list of blocked applications. Additionally, or alternatively, insertion module 106 may also optionally insert, within the same substitute space, (i) an identifier of one or more virtual machines through which network packet 122 was processed when traversing through overlay network 250 within cloud computing platform 240 and/or (ii) an order in which network packet 122 traversed through these virtual machines within overlay network 250. These latter items of information may enable overlay network 250 to effectively process return or responsive network traffic in an order that is symmetrical to the same way in which network packet 122 was originally processed prior to releasing onto the larger Internet. Furthermore, FIG. 6 also illustrates how insertion module 106 may optionally insert a new IP header 636 into network packet 122, which may specify item of information (iii) listed above, which may correspond to the translated public Internet protocol address at cloud computing platform 240 which results from translating the combination of items of information (i) and (ii), as further discussed above. Accordingly, the responsive network traffic to network packet 122, after this network packet is released into the larger Internet, should be directed back to the public Internet protocol address of new IP header 636, thereby enabling overlay network 250 within cloud computing platform 240 to effectively process the responsive network traffic prior to forwarding the network traffic back to user 410.

Furthermore, FIG. 6 also illustrates how, after insertion module 106 inserts new IP header 636 and/or inserted NAT 638, as discussed above, insertion module 106 may also optionally delete inserted NAT 638 prior to releasing the modified network packet onto the larger Internet. In other words, one or more security/management virtual machines may already have cached NAT 638, thereby enabling these virtual machines to appropriately identify computing device 202 and/or appropriately route responsive network traffic back to computing device 202, and yet these items of information do not need to be exposed to the Internet. Moreover, FIG. 6 also further illustrates how, at the end of the sequence of processing outlined above, modified network packet 122 may be released into the larger Internet according to a second additional in-line zero-copy operation 612, which again skips one or more copy operations with respect to kernel mode space 604.

Figure 7:
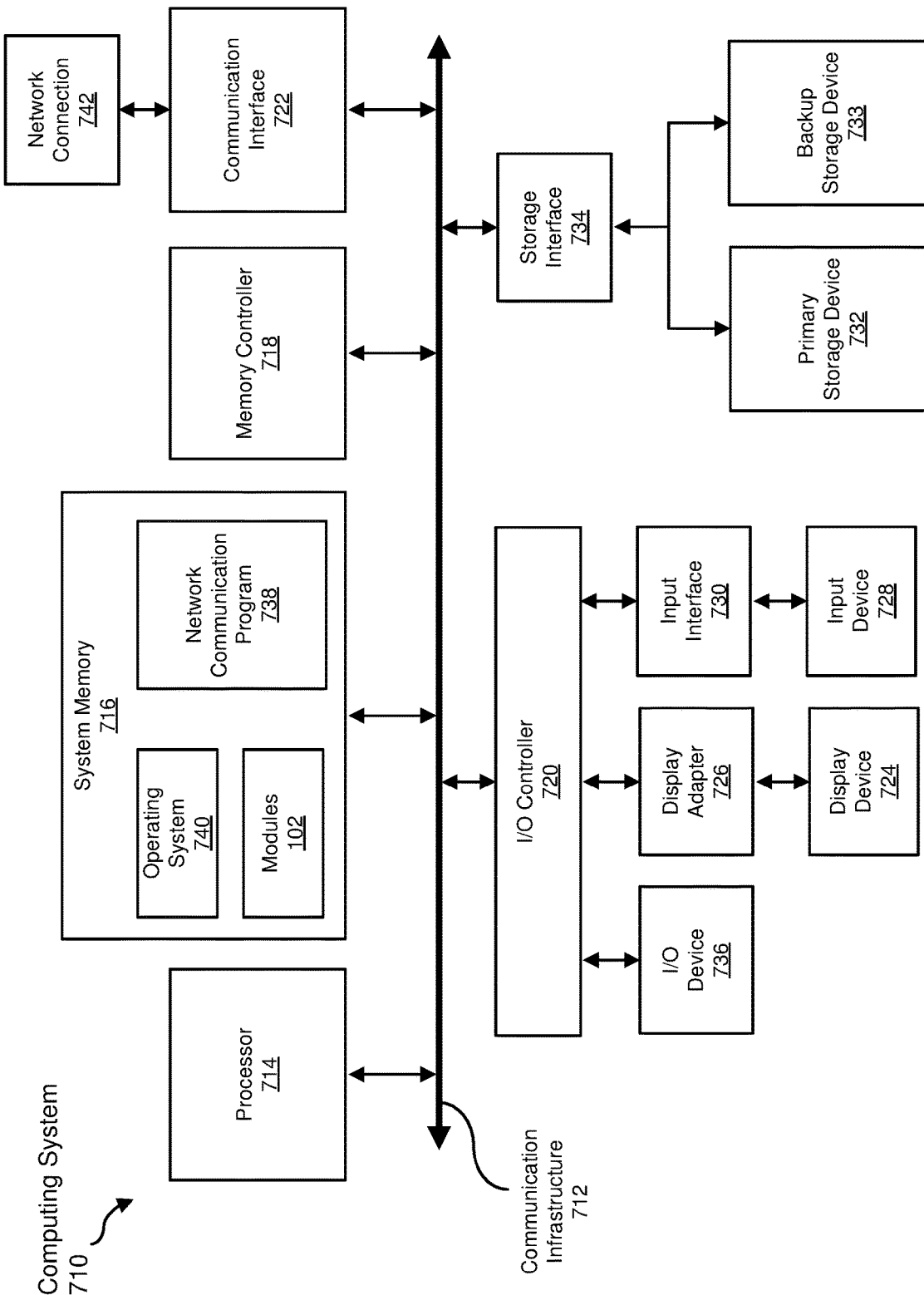
FIG. 7 is a block diagram of an example computing system capable of implementing one or more of the embodiments described and/or illustrated herein.

FIG. 7 is a block diagram of an example computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the example embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In some examples, system memory 716 may store and/or load an operating system 740 for execution by processor 714. In one example, operating system 740 may include and/or represent software that manages computer hardware and software resources and/or provides common services to computer programs and/or applications on computing system 710. Examples of operating system 740 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

As illustrated in FIG. 7, computing system 710 may also include at least one display device 724 coupled to I/O controller 720 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, example computing system 710 may also include at least one input device 728 coupled to I/O controller 720 via an input interface 730. Input device 728 generally represents any type or form of input device capable of providing input, either computer or human generated, to example computing system 710. Examples of input device 728 include, without limitation, a keyboard, a pointing device, a speech recognition device, variations or combinations of one or more of the same, and/or any other input device.

Additionally or alternatively, example computing system 710 may include additional I/O devices. For example, example computing system 710 may include I/O device 736. In this example, I/O device 736 may include and/or represent a user interface that facilitates human interaction with computing system 710. Examples of I/O device 736 include, without limitation, a computer mouse, a keyboard, a monitor, a printer, a modem, a camera, a scanner, a microphone, a touchscreen device, variations or combinations of one or more of the same, and/or any other I/O device.

Communication interface 722 broadly represents any type or form of communication device or adapter capable of facilitating communication between example computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

In some examples, system memory 716 may store and/or load a network communication program 738 for execution by processor 714. In one example, network communication program 738 may include and/or represent software that enables computing system 710 to establish a network connection 742 with another computing system (not illustrated in FIG. 7) and/or communicate with the other computing system by way of communication interface 722. In this example, network communication program 738 may direct the flow of outgoing traffic that is sent to the other computing system via network connection 742. Additionally or alternatively, network communication program 738 may direct the processing of incoming traffic that is received from the other computing system via network connection 742 in connection with processor 714.

Although not illustrated in this way in FIG. 7, network communication program 738 may alternatively be stored and/or loaded in communication interface 722. For example, network communication program 738 may include and/or represent at least a portion of software and/or firmware that is executed by a processor and/or Application Specific Integrated Circuit (ASIC) incorporated in communication interface 722.

As illustrated in FIG. 7, example computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 710 may be configured as an Application Specific Integrated Circuit (ASIC) adapted to implement one or more of the example embodiments disclosed herein.

Figure 8:
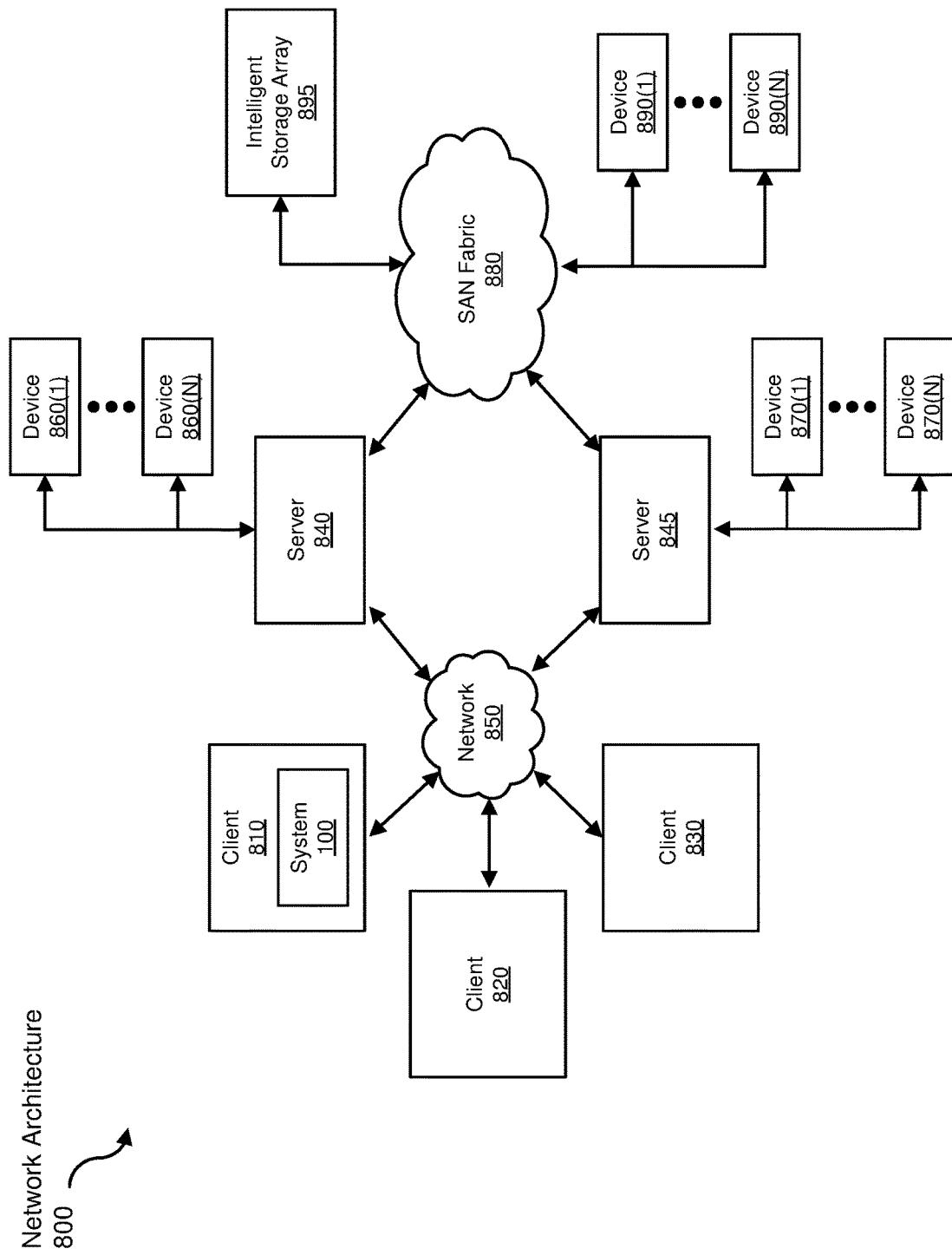
FIG. 8 is a block diagram of an example computing network capable of implementing one or more of the embodiments described and/or illustrated herein.

FIG. 8 is a block diagram of an example network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as example computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(i)-(N) may be directly attached to server 845. Storage devices 860(i)-(N) and storage devices 870(i)-(N) generally represent any type or form of storage device or medium capable of storing data and/or other computer-readable instructions. In certain embodiments, storage devices 860(i)-(N) and storage devices 870(i)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(i)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(i)-(N) and array 895 appear as locally attached devices to client systems 810, 820, and 830. As with storage devices 860(1)-(N) and storage devices 870(i)-(N), storage devices 890(i)-(N) and intelligent storage array 895 generally represent any type or form of storage device or medium capable of storing data and/or other computer-readable instructions.

In certain embodiments, and with reference to example computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(i)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 840, server 845, storage devices 860(i)-(N), storage devices 870(i)-(N), storage devices 890(i)-(N), intelligent storage array 895, or any combination thereof. All or a portion of one or more of the example embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an example method for improving network efficiency.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for improving network efficiency, at least a portion of the method being performed by a computing device comprising at least one processor, the method comprising:
    receiving, from a client device, and at a publicly available on-demand cloud computing platform, a network packet that indicates an origination network address of an intermediary local network gateway that forwarded the network packet rather than an actual network address of the client device; and
    inserting, into the network packet, and at the publicly available on-demand cloud computing platform, network address translation information indicating a path to the actual network address of the client device to enable a virtual node within the publicly available on-demand cloud computing platform to identify the client device.

2. The computer-implemented method of claim 1, wherein the network packet is routed to the publicly available on-demand cloud computing platform to perform a service comprising at least one of a security service or a network management service.

3. The computer-implemented method of claim 1, wherein the network address translation information is inserted into a header space within the network packet.

4. The computer-implemented method of claim 3, wherein the header space contains network protocol information that is used for network transmission prior to receiving the network packet at the publicly available on-demand cloud computing platform but is not used within the publicly available on-demand cloud computing platform such that at least a portion of the network protocol information may be overwritten.

5. The computer-implemented method of claim 4, wherein the network protocol information corresponds to a network security protocol.

6. The computer-implemented method of claim 5, wherein the network security protocol comprises IPsec.

7. The computer-implemented method of claim 1, wherein inserting the network address translation information into the network packet is performed according to a distributed algorithm such that any virtual node within the publicly available on-demand cloud computing platform is enabled to execute the distributed algorithm.

8. The computer-implemented method of claim 1, wherein:
inserting the network address translation information is performed for each network packet within an entire transaction of network packets; or
inserting the network address translation information is performed for a first subset of network packets within the entire transaction of network packets.

9. The computer-implemented method of claim 1, wherein the network packet, after inserting the network address translation information, still satisfies a maximum transmission unit.

10. The computer-implemented method of claim 1, wherein:
inserting the network address translation information into the network packet is performed by an overlay network within the publicly available on-demand cloud computing platform;
the overlay network receives the network packet according to an in-line zero-copy network packet routing operation; and
the overlay network forwards the network packet to a final destination according to an in-line zero-copy network packet routing operation.

11. A system for improving network efficiency, the system comprising:
a reception module, stored in memory, that receives, from a client device, and at a publicly available on-demand cloud computing platform, a network packet that indicates an origination network address of an intermediary local network gateway that forwarded the network packet rather than an actual network address of the client device;
an insertion module, stored in memory, that inserts, into the network packet, and at the publicly available on-demand cloud computing platform, network address translation information indicating a path to the actual network address of the client device to enable a virtual node within the publicly available on-demand cloud computing platform to identify the client device; and
at least one physical processor configured to execute the reception module and the insertion module.

12. The system of claim 11, wherein the network address translation information is inserted into a header space within the network packet.

13. The system of claim 12, wherein the header space contains network protocol information that is used for network transmission prior to receiving the network packet at the publicly available on-demand cloud computing platform but is not used within the publicly available on-demand cloud computing platform such that at least a portion of the network protocol information may be overwritten.

14. The system of claim 13, wherein the network protocol information corresponds to a network security protocol.

15. The system of claim 14, wherein the network security protocol comprises IPsec.

16. The system of claim 11, wherein the insertion module inserts the network address translation information into the network packet according to a distributed algorithm such that any virtual node within the publicly available on-demand cloud computing platform is enabled to execute the distributed algorithm.

17. The system of claim 11, wherein:
inserting the network address translation information is performed for each network packet within an entire transaction of network packets; or
inserting the network address translation information is performed for a first subset of network packets within the entire transaction of network packets.

18. The system of claim 11, wherein the network packet, after inserting the network address translation information, still satisfies a maximum transmission unit.

19. The system of claim 11, wherein the network packet is routed to the publicly available on-demand cloud computing platform to perform a service comprising at least one of a security service or a network management service.

20. A non-transitory computer-readable medium comprising one or more computer-readable instructions that, when executed by at least one processor of a computing device, cause the computing device to:
receive, from a client device, and at a publicly available on-demand cloud computing platform, a network packet that indicates an origination network address of an intermediary local network gateway that forwarded the network packet rather than an actual network address of the client device; and
insert, into the network packet, and at the publicly available on-demand cloud computing platform, network address translation information indicating a path to the actual network address of the client device to enable a virtual node within the publicly available on-demand cloud computing platform to identify the client device.

* * * * *